United States Patent
Bristol et al.

(10) Patent No.: US 9,857,839 B1
(45) Date of Patent: Jan. 2, 2018

(54) HOUSING ASSEMBLY WITH MEMBRANE-COVERED FRAME

(71) Applicant: Oculus VR, LLC, Menlo Park, CA (US)

(72) Inventors: Peter Wesley Bristol, Seattle, WA (US); Joseph Patrick Sullivan, Issaquah, WA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 15/244,418

(22) Filed: Aug. 23, 2016

(51) Int. Cl.
*G06F 1/16* (2006.01)

(52) U.S. Cl.
CPC ............ *G06F 1/163* (2013.01); *G06F 1/1637* (2013.01); *G06F 1/1656* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,192,960 A * | 3/1993 | Komamura | ............ | G02C 7/00 348/E13.039 |
| 5,334,991 A * | 8/1994 | Wells | ............ | F16F 15/02 345/7 |
| 5,815,126 A * | 9/1998 | Fan | ............ | G02B 27/017 345/7 |
| 5,844,530 A * | 12/1998 | Tosaki | ............ | G02B 27/017 345/7 |
| 5,903,395 A * | 5/1999 | Rallison | ............ | G02B 27/0172 345/8 |
| 5,991,085 A * | 11/1999 | Rallison | ............ | G02B 27/017 345/8 |
| 6,160,666 A * | 12/2000 | Rallison | ............ | G02B 27/0101 345/7 |
| 6,304,287 B1 * | 10/2001 | Nagata | ............ | A63F 13/02 345/7 |
| 6,369,952 B1 * | 4/2002 | Rallison | ............ | G02B 27/017 359/630 |
| 8,355,208 B1 * | 1/2013 | Baker | ............ | G02B 27/0176 345/8 |
| 9,075,249 B2 * | 7/2015 | Heinrich | ............ | G02C 11/10 |
| 9,122,082 B2 * | 9/2015 | Abreu | ............ | G02C 3/003 |
| 9,128,281 B2 * | 9/2015 | Osterhout | ............ | G02B 27/017 |
| 9,268,139 B2 * | 2/2016 | Magyari | ............ | G02B 27/0172 |
| 9,274,340 B2 * | 3/2016 | Lyons | ............ | G02B 27/0172 |
| 9,341,843 B2 * | 5/2016 | Border | ............ | G02B 27/0093 |
| 9,366,862 B2 * | 6/2016 | Haddick | ............ | G02B 27/0093 |
| 9,377,626 B2 * | 6/2016 | Lyons | ............ | G02B 27/0172 |
| 9,440,070 B2 * | 9/2016 | Goldwasser | ............ | A61N 1/36082 |

(Continued)

*Primary Examiner* — Lisa Lea Edmonds
(74) *Attorney, Agent, or Firm* — Perkins Coie LLP (57) ABSTRACT

Technology is provided for a housing assembly with a membrane-covered frame for use with head mounted displays. The head mounted display includes a housing assembly having a frame. The frame includes a first loop structure, a second loop structure offset along a central axis from the first loop structure, and a plurality of beams extending between the first loop structure and the second loop structure. A flexible membrane extends around the frame to enclose the housing assembly and the components therein. One or more display devices are positioned within the housing assembly, and a strap assembly connects to the housing assembly for supporting the head mounted display on a user's head.

20 Claims, 6 Drawing Sheets

(56) References Cited

U.S. PATENT DOCUMENTS

| | | | | |
|---|---|---|---|---|
| D771,625 S | * | 11/2016 | Sullivan | D14/372 |
| 9,557,569 B2 | * | 1/2017 | Tazbaz | G02B 27/0179 |
| 2009/0243965 A1 | * | 10/2009 | Price | G02B 27/0176 |
| | | | | 345/8 |
| 2016/0085278 A1 | * | 3/2016 | Osterhout | G06F 1/206 |
| | | | | 361/679.03 |
| 2016/0147072 A1 | * | 5/2016 | Yamazaki | G06F 1/163 |
| | | | | 345/8 |
| 2016/0370590 A1 | * | 12/2016 | Fujishiro | G02B 27/0176 |
| 2017/0082859 A1 | * | 3/2017 | Drinkwater | G02B 27/0176 |

* cited by examiner

FIG. 6

HOUSING ASSEMBLY WITH MEMBRANE-COVERED FRAME

TECHNICAL FIELD

This patent application is directed to head mounted displays and, more specifically, to head mounted display housings.

BACKGROUND

In a virtual reality system, a user typically wears a head mounted display that presents a selected virtual reality (VR) environment in front of the user's eyes. In some VR systems, the user can manipulate items in the virtual environment with handheld controllers. The head mounted display and controllers include tracking features comprised of a plurality of tracking lights, for example. The system monitors the movement of the tracking lights with a tracking camera and reproduces the user's head and hand movements in the virtual environment.

BRIEF DESCRIPTION OF THE DRAWINGS

Embodiments of the housing assembly with membrane-covered frame introduced herein may be better understood by referring to the following Detailed Description in conjunction with the accompanying drawings, in which like reference numerals indicate identical or functionally similar elements.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

Housing assemblies with membrane-covered frames for use with head mounted displays are disclosed. In an embodiment, a head mounted display includes a housing assembly having a frame. The frame includes a first loop structure, a second loop structure offset along a central axis from the first loop structure, and a plurality of beams extending between the first loop structure and the second loop structure. A flexible membrane extends around the frame to enclose the housing assembly and the components therein. One or more display devices are positioned within the housing assembly, and a strap assembly connects to the housing assembly for supporting the head mounted display on a user's head. The disclosed housing assemblies provide lightweight and aesthetic enclosures for head mounted display components.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Figure 1:
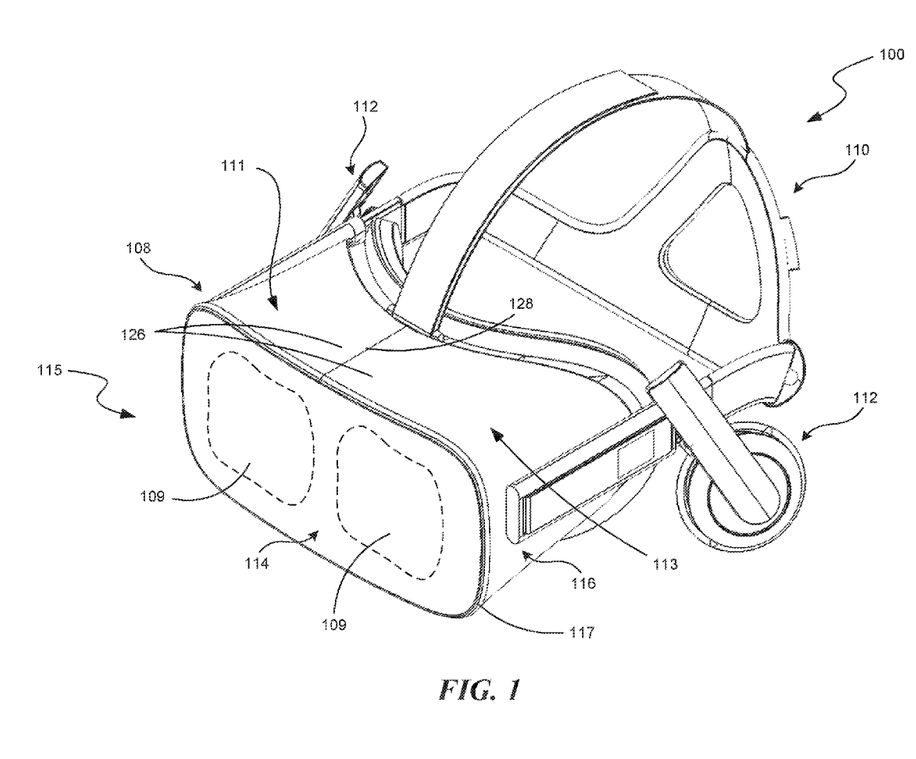
FIG. 1 is an isometric view of a head mounted display according to a representative embodiment.

FIG. 1 illustrates a VR system head mounted display 100 according to a representative embodiment. The head mounted display 100 includes a display unit 108 with a strap assembly 110 configured to support the head mounted display 100 on a user's head. The display unit 108 includes one or more display devices 109 positioned within a housing 111 to present a selected VR environment in front of the user's eyes. In some embodiments, the head mounted display 100 includes audio modules 112 positioned on the left and right sides of the strap assembly 110.

The display unit 108 includes a constellation system 115 with trackable markers selectively distributed on the display unit 108 and configured to be tracked by a camera (not shown). The constellation system 115 of the illustrated embodiment includes front tracking constellation assembly 114 and one or more sidewall tracking constellation assemblies 116. The tracking constellation assemblies 114 and 116 include a plurality of lights (e.g., light emitting diodes) or other trackable markers that can be tracked by the tracking camera. The constellation system 115 is further described in U.S. patent application Ser. No. 14/991,875, filed Jan. 8, 2016, and entitled TRACKING CONSTELLATION ASSEMBLY FOR USE IN A VIRTUAL REALITY SYSTEM, the disclosure of which is hereby incorporated by reference in its entirety.

Figure 2:
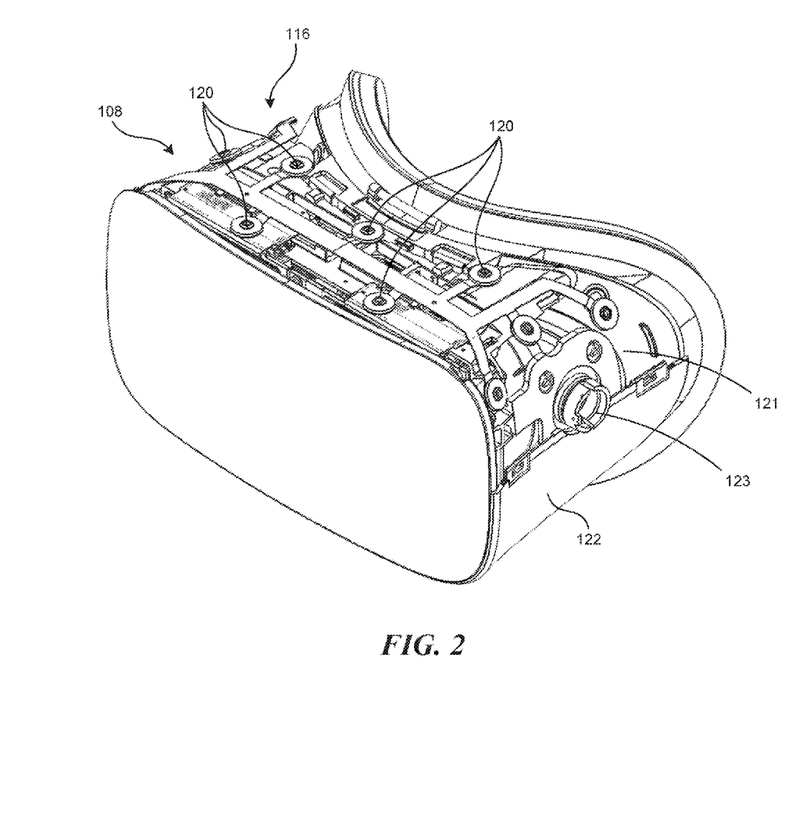
FIG. 2 is an isometric view of the display unit shown in FIG. 1 with various components hidden to show the tracking constellation.

In the embodiment depicted in FIGS. 1 and 2, the housing 111 includes an exterior fabric layer 113 bonded to one or more covers 122 that form a tubular shell. The fabric layer 113 can be rolled over the edges of the covers 122 to provide rounded edge features 117 at the edges of the shell. In some embodiments, the fabric layer is bonded to the covers with a hot-melt adhesive film. In some embodiments, the fabric layer 113 is in the form of a strip of fabric wrapped around the tubular shell with ends 126 of the strip joined at a butt joint seam 128.

As shown in FIG. 2, the covers 122 surround an internal chassis 121 that supports the electronics and other components of the display unit 108. The covers 122 are positioned to protect and/or at least partially hide the tracking constellation from a user's view and are transparent or translucent relative to the constellation's light emitting diodes 120 so the generated light is visible to the tracking camera. The covers 122 also include openings though which fittings 123 extend for attaching the strap assembly 110. The covers 122 can comprise a panel substantially opaque to visible light (i.e., light within the spectrum substantially visible to humans) yet translucent to infrared light. In some embodiments, the covers 122 are made of a plastic material substantially opaque to visible light and substantially transparent to infrared light. The fabric layer 113 is also at least translucent to infrared light.

Figure 3:
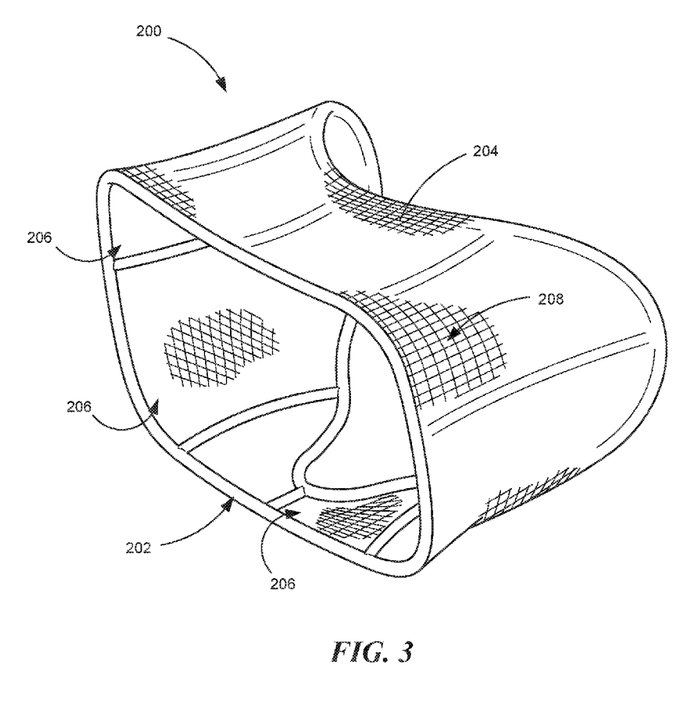
FIG. 3 is an isometric view of a housing assembly according to a representative embodiment.

FIG. 3 illustrates another representative embodiment of a head mounted display housing assembly 200 that does not use the covers 122 shown in FIGS. 1 and 2 and instead incorporates a membrane-covered frame 202. The frame 202 is wrapped with a flexible membrane 204 (e.g., fabric). The membrane 204 is stretched around the frame 202, which has various openings 206, wherein the frame 202 imparts corresponding contours 208 to the membrane 204 across the frame openings 206. The frame 202 is contoured and configured to support the membrane 204, so that when the membrane 204 is stretched over and/or installed on the frame 202, the membrane 204 has smooth, arcuate contours that provide an aesthetically pleasing appearance, while maintaining a protective and durable frame around the electrical and/or optical components within the housing. In some embodiments, the membrane 204 is translucent to infrared light allowing the light emitting diodes 120 of the constellation system 115 to be registered by the camera through the openings 206. The frame 202 provides a lightweight enclosure for the constellation system 115, the display devices 109, and other components. The frame 202 surrounds the internal chassis 121 (FIG. 2) that supports the electronics and other components. The flexible membrane 204 conceals the frame 202 and the components within the frame while providing an aesthetic appearance. In some embodiments, the housing assembly 200 is configured to accommodate the fittings 123 for attaching the strap assembly 110 (FIGS. 1 and 2).

In some embodiments, the membrane 204 is made at least primarily of fabric. Suitable fabrics include woven and non-woven compositions of synthetic fibers (e.g., nylon, rayon, spandex, etc.) and/or natural fibers (e.g., cotton, wool, etc.). In other embodiments, the membrane 204 can be made at least primarily of a non-fabric material. Suitable non-fabric materials include thin-films (e.g., extruded and/or calendered films) of one or more polymeric materials (e.g., rubber, polyamides, polyurethanes, etc.). Many suitable fabric and non-fabric materials for the membrane 204 are polymeric materials. Thus, in at least some cases, the membrane 204 is made at least primarily of polymeric material. The membrane 204 can comprise a continuous sleeve or tube of material stretched onto the frame 202 as depicted in FIG. 3. In other embodiments, the membrane 204 can comprise a strip of material stretched around the frame 202 and joined at a seam.

Figure 4:
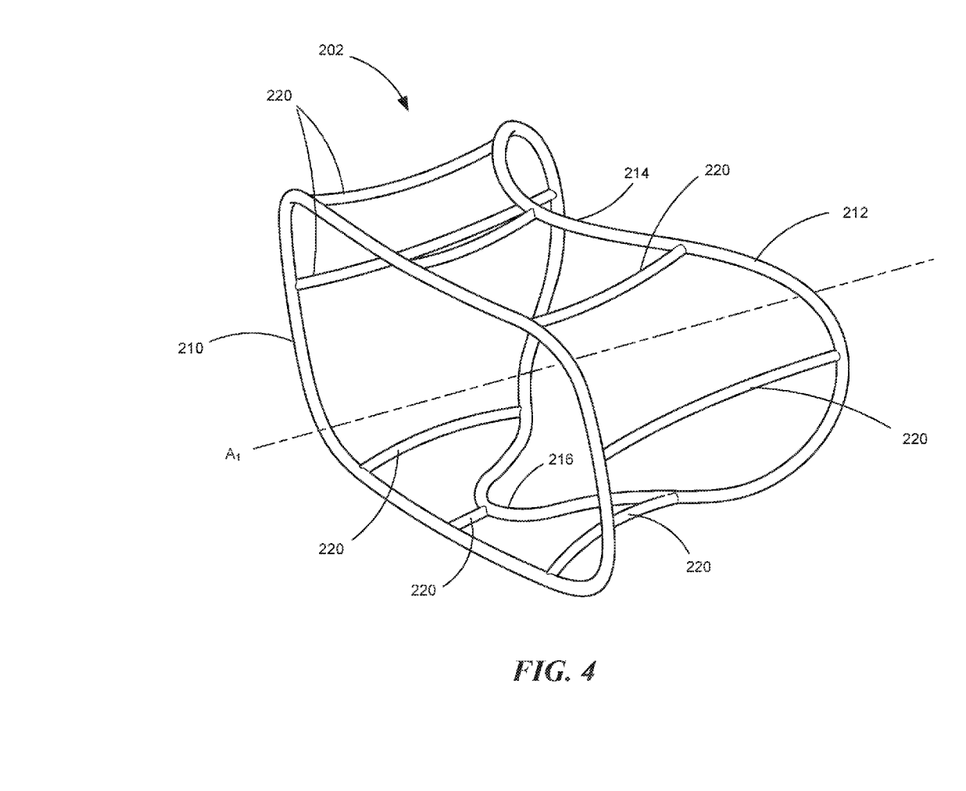
FIG. 4 is an isometric view of the frame underlying the housing assembly of FIG. 3.

With further reference to FIG. 4, the frame 202 includes a first loop structure 210 and a second loop structure 212 offset from the first loop structure 210 along a central axis $A_1$. A plurality of beams 220 extend between the first loop structure 210 and the second loop structure 212. In some embodiments, the beams 220 are substantially parallel to the central axis $A_1$. In some embodiments, the first and second loop structures 210/212 comprise closed loop structures as depicted in FIG. 4. In other embodiments, the loop structures can be discontinuous or open loops. The second loop structure 212 includes an arcuate forehead section 214 and an arcuate nose section 216 to accommodate the facial features of the user. Although, frame 202 includes beams extending between the first and second loop structures 210/212 parallel to the central axis $A_1$, other structures or patterns of beam and loops can be used to create a frame with openings to provide aesthetic contours and constellation visibility. In some embodiments, the membrane 204 can comprise a tube of material that is closed on one end that spans across the second loop structure 212. The open end of the closed tube of material can be attached to the first loop structure 210 with hooks, for example.

Figure 5:
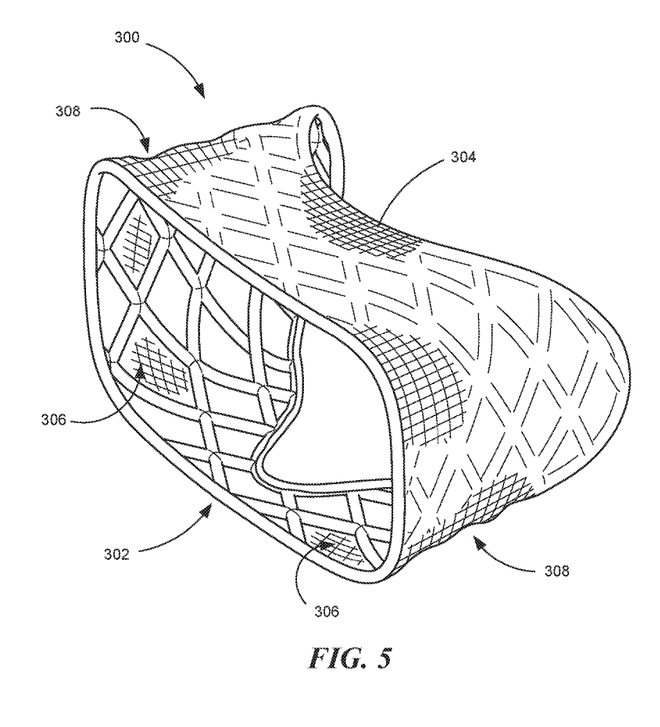
FIG. 5 is an isometric view of a housing assembly according to another representative embodiment.

FIG. 5 illustrates a housing assembly 300 according to a further representative embodiment. The housing assembly 300 comprises a frame 302 wrapped with a flexible membrane 304. The membrane 304 is stretched around the frame 302, which has various openings 306, wherein the frame 302 imparts corresponding contours 308 to the membrane 304 across the frame openings 306.

Figure 6:
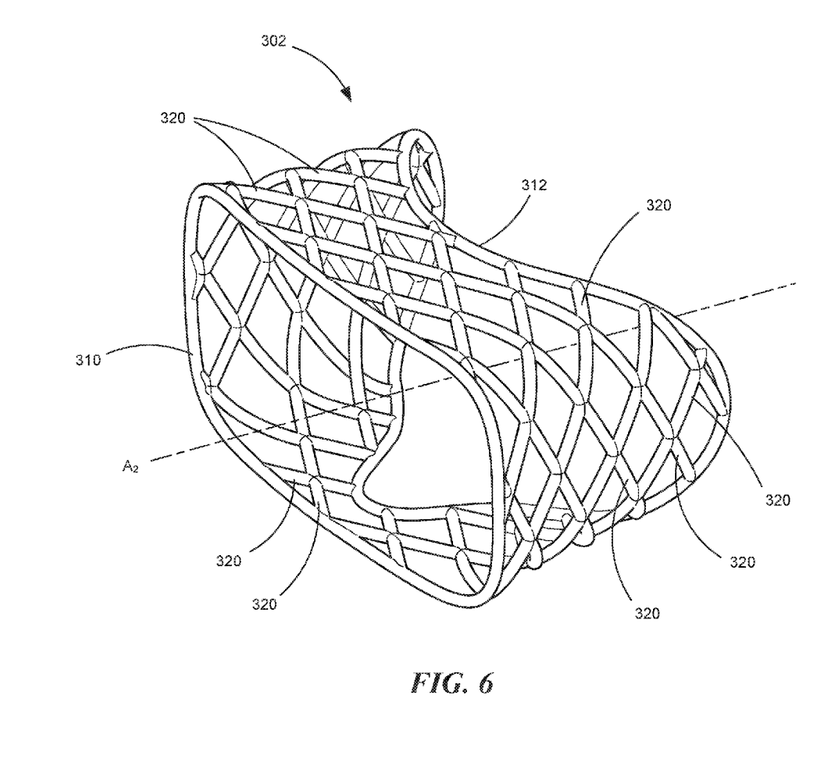
FIG. 6 is an isometric view of the frame underlying the housing assembly of FIG. 5.

With further reference to FIG. 6, the frame 302 includes beams 320 arranged in a diamond or crisscross pattern. The frame 302 includes a first loop structure 310 and a second loop structure 312 offset from the first loop structure 310 along a central axis $A_2$. The beams 320 extend diagonally, with respect to central axis $A_2$, between the first loop structure 310 and the second loop structure 312 to create the depicted diamond pattern.

In some embodiments, the flexible membranes 204/304 are interchangeable. For example, the flexible membranes 204/304 can be replaced with different color membranes. In some embodiments, the flexible membranes 204/304 can include graphics, patterns, decorations, and the like. Thus, a user can customize their head mounted display by changing the flexible membrane 204/304 to suit their taste. In some embodiments, the frames 202/302 are interchangeable. For example, the frames 202/302 can be removably attached to the internal chassis 121 (FIG. 2). In some embodiments the frames 202/302 are can be snapped on and off of the internal chassis 121 (FIG. 2), for example.

The frames 202/302 can comprise suitable materials such as metal or plastic, for example. In some embodiments, the frames 202/302 can be rigid or flexible. In some embodiments, the frames 202/302 can be molded and/or machined. In other embodiments, the frames 202/302 can be produced with an additive manufacturing process e.g., 3D printing. In some embodiments, computer readable information representing a computer aided design (CAD) model of a frame 202/302 can be transmitted to a machine (e.g., a 3D printer or a computer numerical control (CNC) machine) in order to produce frames from a suitable material such as plastic or metal, for example.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A head mounted display housing assembly, comprising:
   a frame including:
      a first loop structure;
      a second loop structure offset from the first loop structure along a central axis; and
      a plurality of beams extending between the first loop structure and the second loop structure; and
   a flexible membrane extending around the frame.

2. The housing assembly of claim 1, wherein the flexible membrane is stretched around the frame whereby the plurality of beams impart corresponding contours to the flexible membrane.

3. The housing assembly of claim 1, wherein the first loop structure and the second loop structure are closed loops.

4. The housing assembly of claim 1, wherein the second loop structure includes an arcuate forehead section and an arcuate nose section.

5. The housing assembly of claim 1, wherein the plurality of beams are substantially parallel to the central axis.

6. The housing assembly of claim 1, wherein the plurality of beams extend diagonally with respect to the central axis.

7. The housing assembly of claim 1, wherein the membrane comprises a tube of material.

8. The housing assembly of claim 7, wherein the material is made at least primarily of fabric.

9. The housing assembly of claim 7, wherein the material is made at least primarily of polymeric material.

10. A head mounted display, comprising:
    a housing assembly, including:
       a frame including:
          a first loop structure;
          a second loop structure offset along a central axis from the first loop structure; and
          a plurality of beams extending between the first loop structure and the second loop structure; and
       a flexible membrane extending around the frame;
    one or more display devices positioned within the housing assembly; and
    a strap assembly connected to the housing assembly.

11. The head mounted display of claim 10, wherein the flexible membrane is stretched around the frame whereby the plurality of beams impart corresponding contours to the flexible membrane.

12. The head mounted display of claim 10, wherein the second loop structure includes an arcuate forehead section and an arcuate nose section.

13. The head mounted display of claim 10, wherein the plurality of beams are substantially parallel to the central axis.

14. The head mounted display of claim 10, wherein the plurality of beams extend diagonally with respect to the central axis.

15. A head mounted display, comprising:
    a housing assembly, including:
       a frame including:
          a first closed loop structure;
          a second closed loop structure offset along a central axis from the first loop structure; and
          a plurality of beams extending between the first loop structure and the second loop structure; and
       a tubular membrane stretched around the frame whereby the plurality of beams impart corresponding contours to the tubular membrane;
    one or more display devices positioned within the housing assembly; and
    a strap assembly connected to the housing assembly.

16. The head mounted display of claim 15, wherein the second loop structure includes an arcuate forehead section and an arcuate nose section.

17. The head mounted display of claim 15, wherein the plurality of beams are substantially parallel to the central axis.

18. The head mounted display of claim 15, wherein the plurality of beams extend diagonally with respect to the central axis.

19. The head mounted display of claim 15, wherein the tubular membrane is made at least primarily of fabric.

20. The head mounted display of claim 15, wherein the tubular membrane is made at least primarily of polymeric material.

* * * * *